(No Model.)  10 Sheets—Sheet 4.

J. F. APPLEBY.
GRAIN BINDER.

No. 262,883.  Patented Aug. 15, 1882.

(No Model.)

J. F. APPLEBY.
GRAIN BINDER.

Patented Aug. 15, 1882.

WITNESSES

INVENTOR

By Attorney (No Model.)  J. F. APPLEBY.  10 Sheets—Sheet 7.
GRAIN BINDER.

No. 262,883.  Patented Aug. 15, 1882.

(No Model.)

J. F. APPLEBY.
GRAIN BINDER.

No. 262,883. Patented Aug. 15, 1882.

(No Model.) 10 Sheets—Sheet 10.

J. F. APPLEBY.
GRAIN BINDER.

No. 262,883. Patented Aug. 15, 1882.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

GRAIN-BINDER.

SPECIFICATION forming part of Letters Patent No. 262,883, dated August 15, 1882.

Application filed June 29, 1881. (No model.)

*To all whom it may concern:*

Be it known that I, JOHN F. APPLEBY, of Minneapolis, in the county of Hennepin and State of Minnesota, have invented certain new and useful Improvements in Grain-Binding Harvesters; and I do hereby declare that the following is a full and exact description thereof, reference being had to the accompanying drawings, making a part of this application.

The general organization of the apparatus or contrivance made the subject-matter of this application being very similar to that of the self-binder shown and described in the United States Letters Patent granted to me February 18, 1879, and numbered 212,420, I herein merely make reference to said patent for an understanding of such portions of the construction and so much of the operations of my present machine as are substantially similar to those of said patented machine, directing the descriptive part of my present specification more particularly to explanations of the novel features only of my present improved machine as compared with the machine shown in said patent.

To enable those skilled in the art to make and use a machine embodying my present improvements, I will now proceed to fully explain said improvements, referring by letters to the accompanying drawings, and alluding in general terms to my said patent for the purpose of more intelligibly pointing out the several features of invention which form the subject-matter of this application. To do this in the most comprehensive manner, I have generally lettered those parts which are common to the machine shown in the accompanying drawings and that shown in my said patent with the same letters.

In the several figures the same part will of course be found designated by the same reference-letter.

The shaft M, which corresponds with the shaft similarly lettered in the drawings of the patent to which I have hereinbefore alluded, is provided (as in the said patent) with a sprocket-wheel, *b*, through the medium of which and a drive-chain engaging therewith and banded to a wheel on a driving-shaft of the harvester the necessary power for operating all the moving parts of the binder is derived from said shaft.

Figure 1:
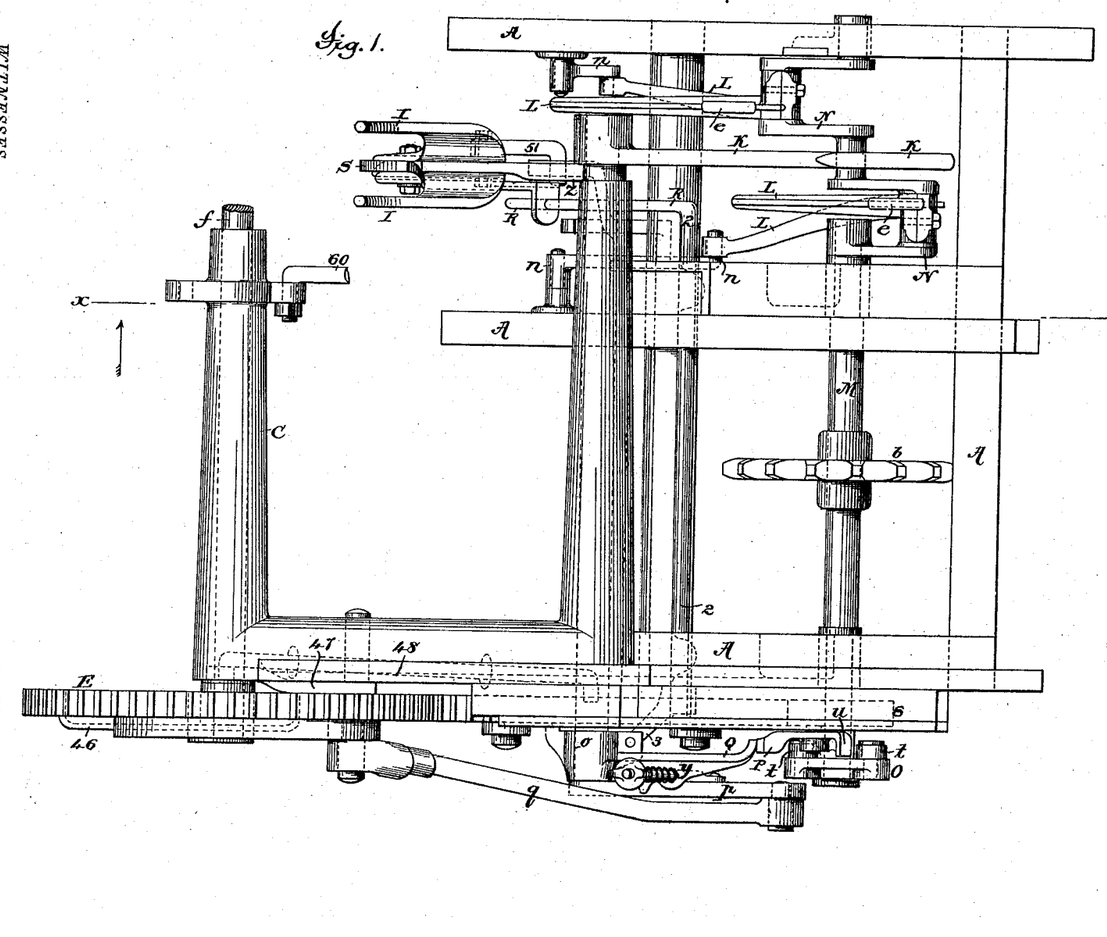
Figure 1 is a partial top view of my improved self-binder.
Figure 4:
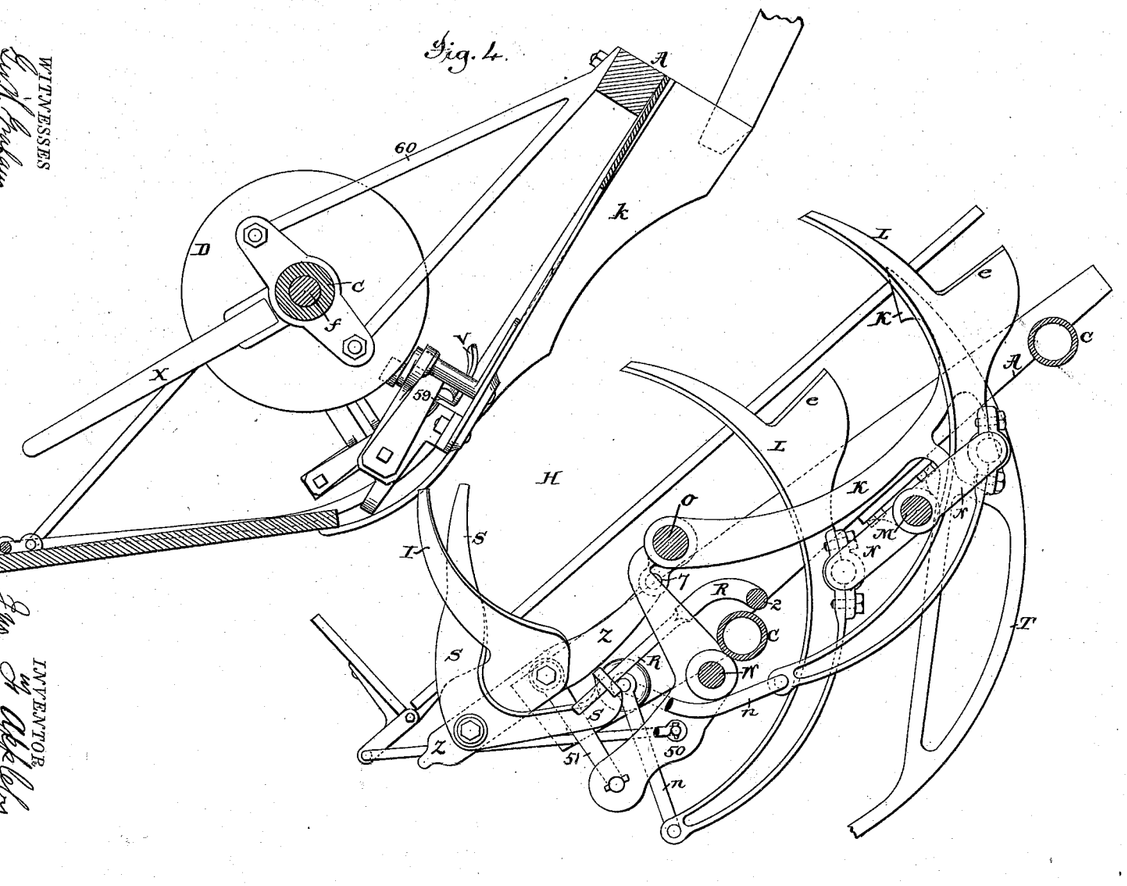
Fig. 4 is a transverse vertical section at the line *x x* of Fig. 1, looking in the direction indicated by the arrow, showing the moving parts in certain relative positions.
Figure 5:
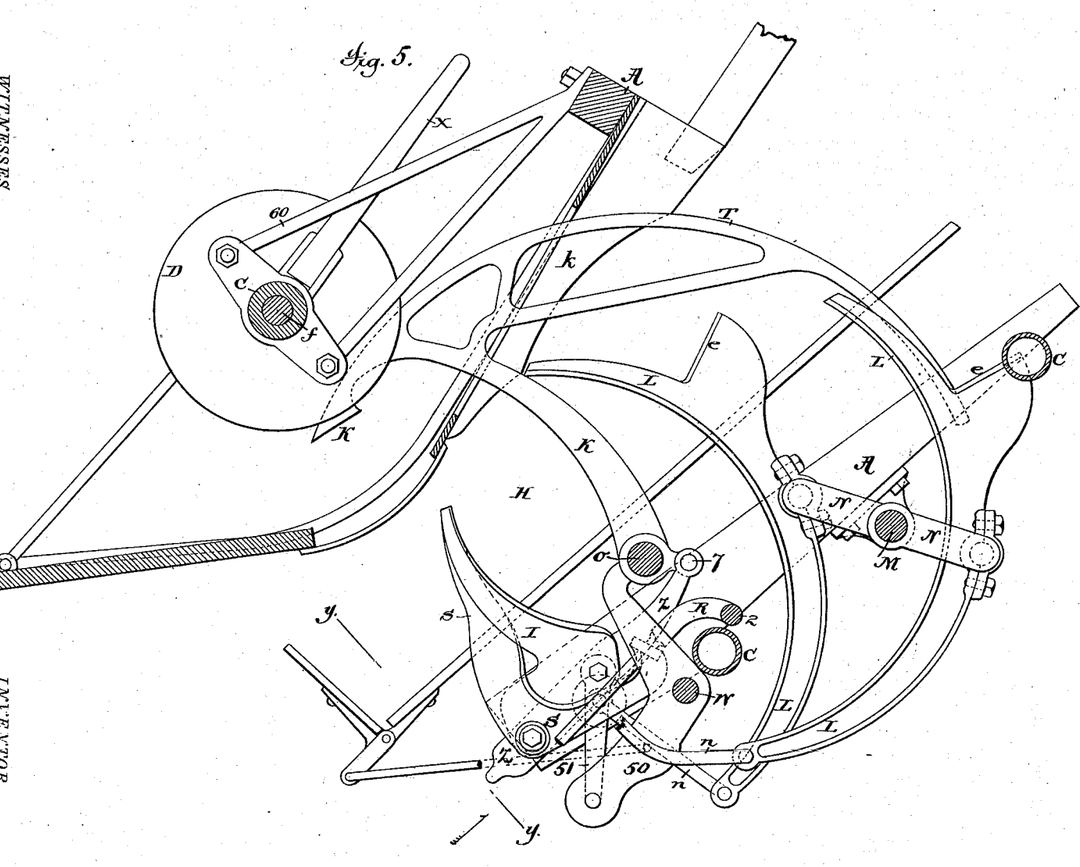
Fig. 5 is a similar section showing the said parts in different relative positions.
Figure 6:
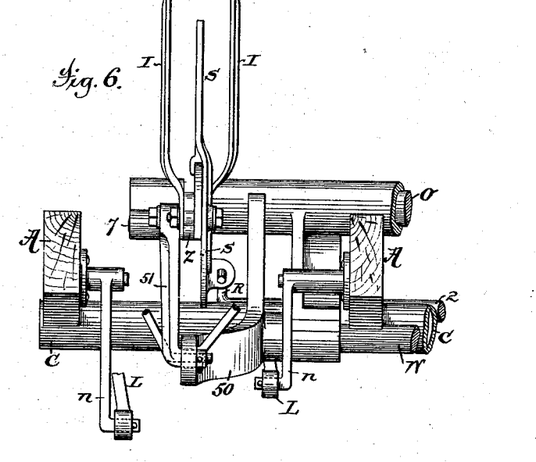
Fig. 6 is a skeleton sectional view at about the line *y y* of Fig. 5, looking in the direction indicated by the arrow.
Figure 7:
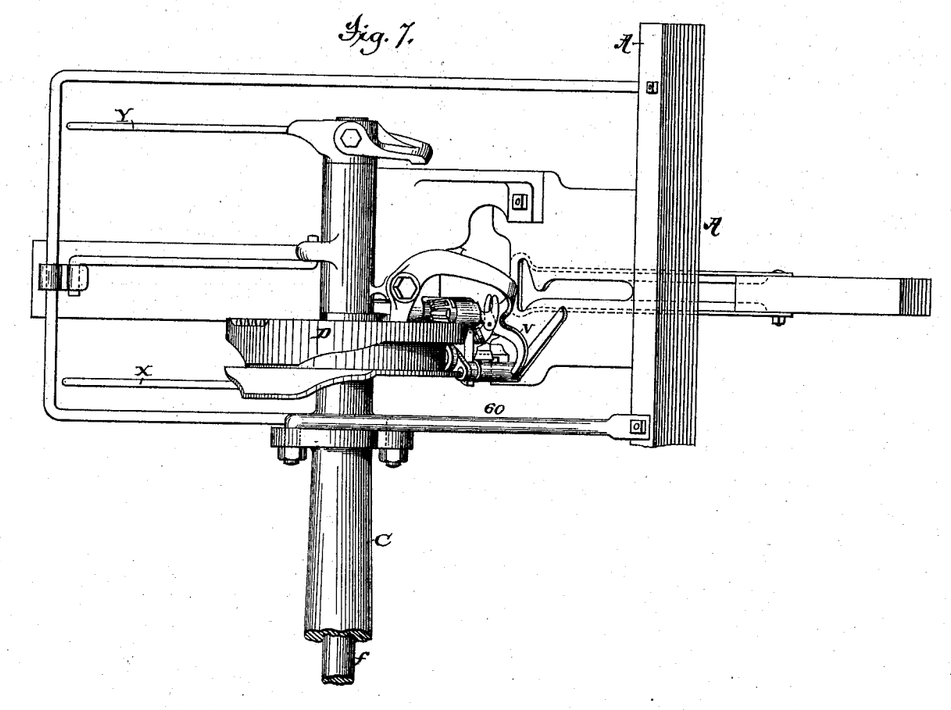
Fig. 7 is a partial top view, showing more particularly the tying mechanism and the revolving sheaf-discharging arms.
Figure 8:
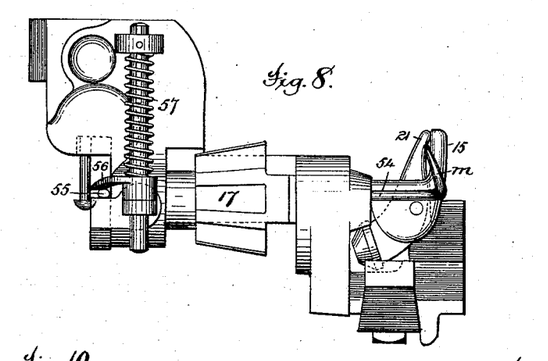
Fig. 8 is a top view, on an enlarged scale, of the knot-tying hook and connected devices.

Instead of having the packing-arms L L, which operate to pack the grain in the receiver or receptacle H, driven one from the shaft M and the other by a drive-chain from the main driving-shaft, as in the case of the machine shown in my said patent, and as is necessary in an organization precisely such as shown in said patent, I now provide the shaft M with two cranks, N N, as shown in Figs. 1, 4, and 5, which are set opposite to each other in their circles of motion, and which drive the two packing-arms L L, as clearly illustrated; but this change I make a part of the subject-matter of another application for Letters Patent, and do not claim it herein.

The cord-needle and compressor arm, it will be observed, is arranged so that it moves outside of the shaft M and intermediate of the cranks N N, and hence without interference with any of these parts of the machine, while the guard T of the needle and compressor arm is attached to said arm, by preference, in such a manner (as clearly shown) that said guard can pass down to one side of and over that part of the shaft M which lies between and connects the two cranks N N, as best seen in Fig. 4. This peculiar construction, however, forms the subject of a claim in my said other application.

The packing-arms L L are combined at their lower ends or heels with arms $n\ n$ in the manner shown in my said patent, but are, in the present case, formed or provided at their upper edges and not far from their front ends with upwardly-projecting shoulders $e\ e$, as shown, the purpose and effect of which need not be here described, as they form part of the subject-matter of my said other application.

As in the machine shown in my said patent, the necessary motions of all the intermittingly-moving parts of the binder are derived from a drive-wheel, E, which is periodically rotated once on its axis by power from the continuously-revolving shaft M, transmitted through the medium of devices substantially similar to those shown in said patent; but the method and means I employ in the present case for effecting the tripping of the lever-stop P by the pressure of the compressed grain in the gavel-receptacle differ essentially from those shown in my said patent. Instead of using the fingers I I, which support (from beneath) the accumulating gavel, to impart the tripping movement to the said lever-stop, I employ for this purpose an auxiliary lever or finger, S, which is located, as shown, midway between the fingers I I, and stands a little higher than said fingers.

Figure 2:
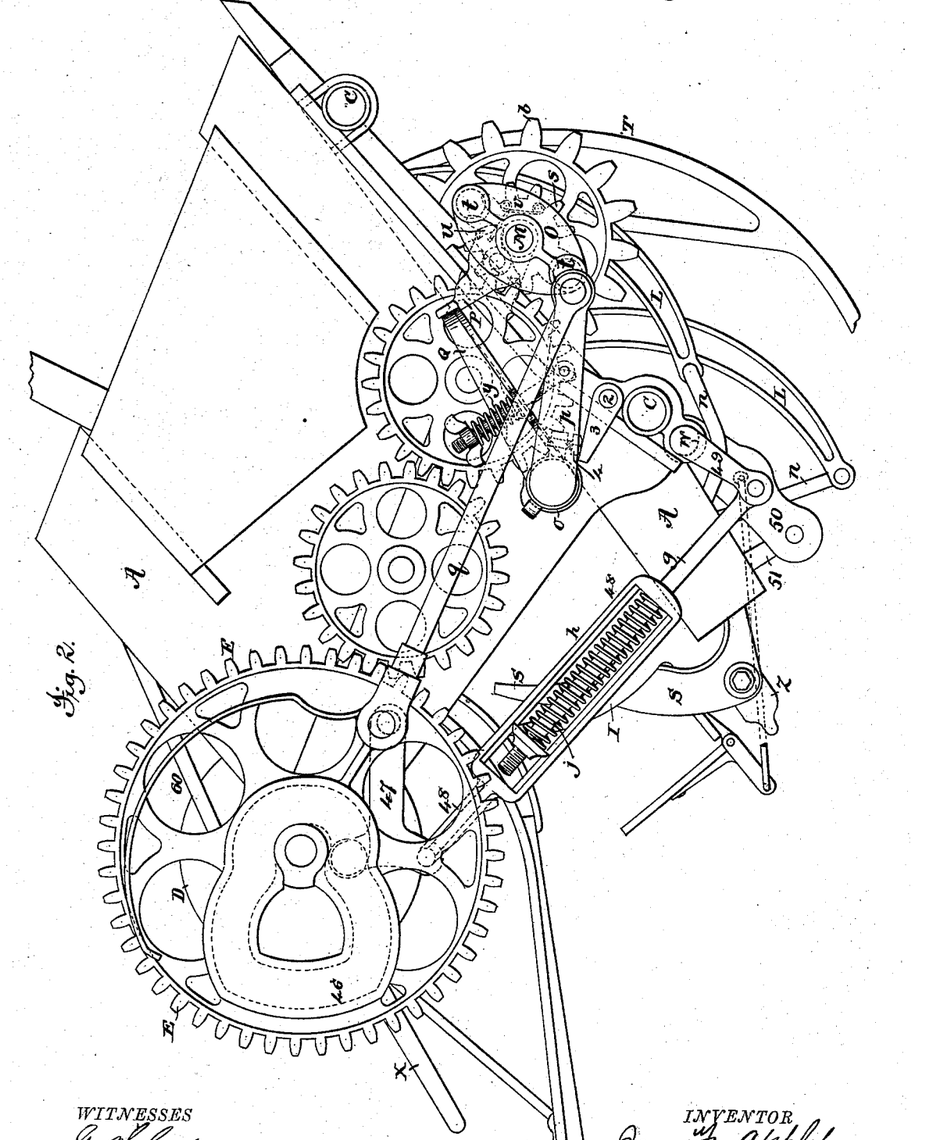
Fig. 2 is a front elevation of the same.
Figure 3:
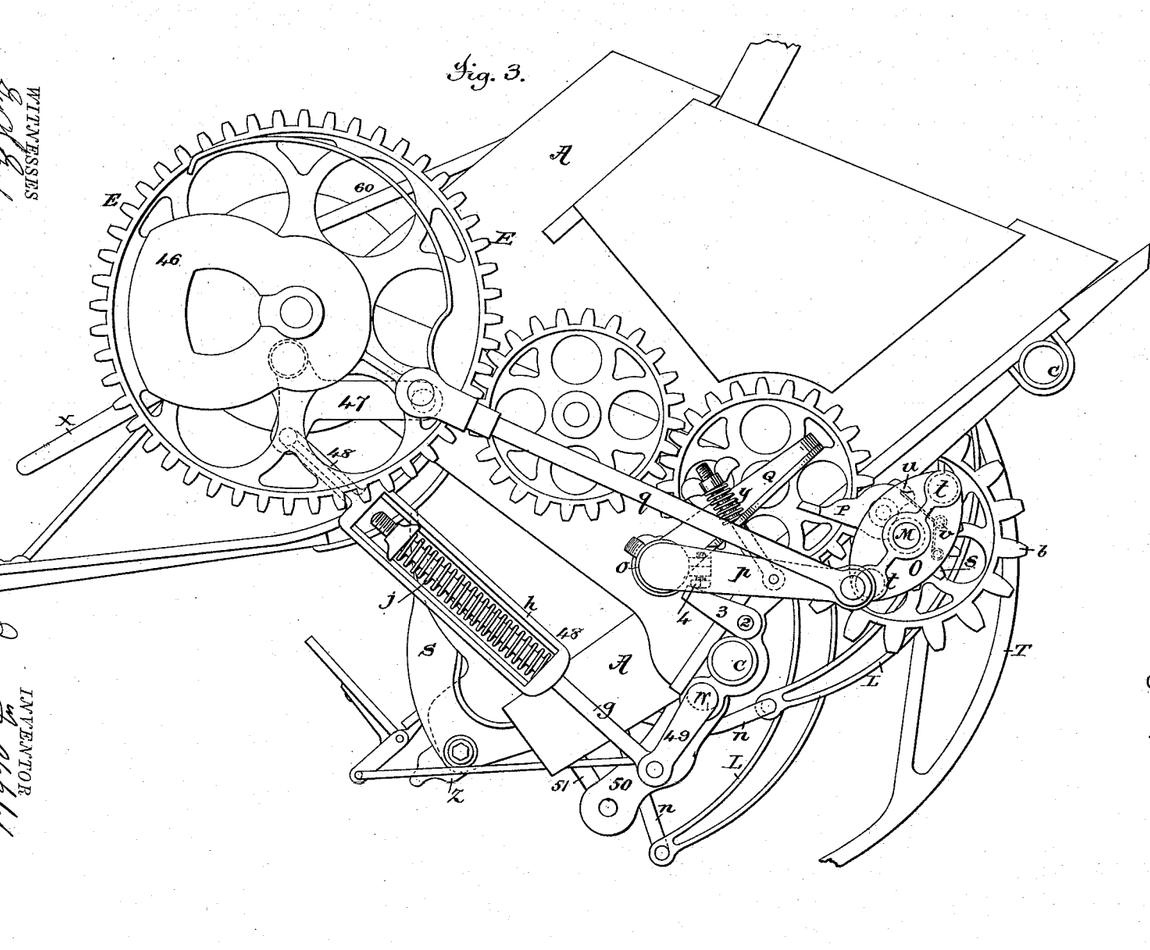
Fig. 3 is a similar view with the parts in slightly different positions.

In the operation of the machine the downward pressure of the grain as it is being packed into the gavel-receptacle comes mostly or entirely on the auxiliary finger S until the accumulation of the necessary quantity to form a sheaf shall have been effected, when the said finger S will have been depressed to a point such as to permit the fingers I I to begin to receive the pressure of the gavel, and to subsequently move up to assist in the compression of the gavel, and will have effected the tripping of the device, by which all the other parts of the binder are set to work. The positions of the lever or finger S and its connected parts previous to the tripping effect are best shown in Figs. 2 and 4, while in Figs. 3 and 5 are shown respectively the positions of the said parts immediately after the accomplishment of said tripping effect and after the needle-arm shall have advanced and compressed the gavel. The finger S is pivoted to the sustaining-bar Z, and its upper portion is connected by an arm, R, with the rock-shaft 2, that carries the arm 3 for striking the projection 4 of the arm Q, all in substantially the manner in which the pivoted fingers I I are pivoted and connected to do the tripping in the machine shown in my said patent. By the employment of the auxiliary finger S, arranged and operating as shown and described, I am enabled to effect a cross-creasing of the gavel centrally, and thus insure the placement of the cord centrally about the gavel with more certainty and produce greater uniformity in the sheaves and in the acting of the binding mechanism than was possible in a binder such as shown in said patent, while at the same time any liability to pinch the cord between the gavel and either of the fingers I I while moving up, and thus make a double in the cord that will (after the tying of the latter) cause the sheaf to be tied loosely, is effectually avoided. As the cord lies in the crease or depression made by the auxiliary finger S, it will always be drawn tight around the gavel in tying up the latter without impediment by interference with either of the fingers I I.

The operations and effects of the fingers I I, aside from their incapacity for any tripping function, are about the same as in the case of my said patented machine.

In the present case the connecting rod or bar 48 is of an improved construction, which need not, however, be here described, as it forms part of the subject-matter of my other application above referred to.

Figure 9:
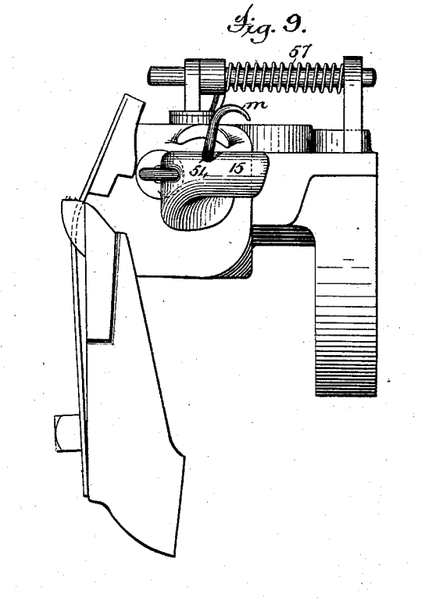
Fig. 9 is a front view of said mechanism on same scale, representing it in the position in which it would appear at one step or stage of its movement.
Figure 10:
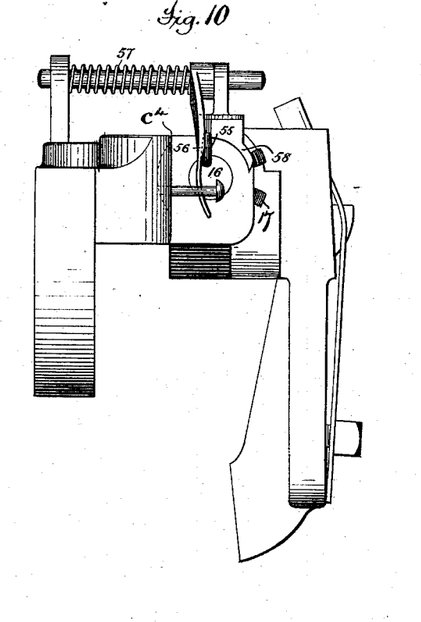
Fig. 10 is a back view of said parts (same scale) while in the position indicated at Fig. 9.
Figure 11:
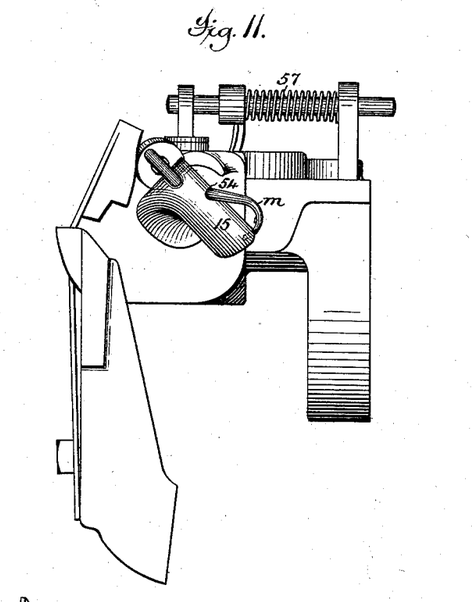
Fig. 11 is a front view of said devices, (same scale,) showing them in the position in which they would be at another step in their movements.
Figure 12:
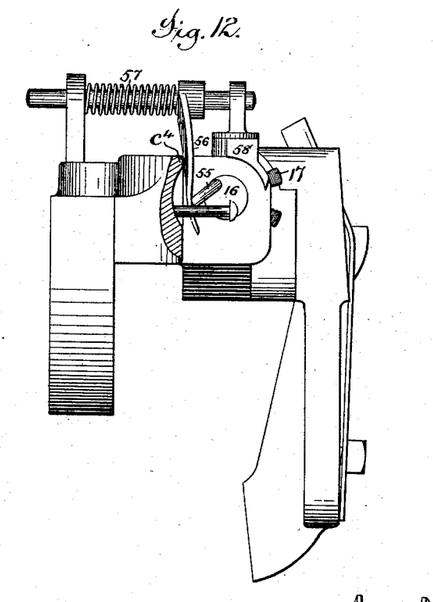
Fig. 12 is a back view of the same devices when in the positions indicated in the last-mentioned figure.
Figure 14:
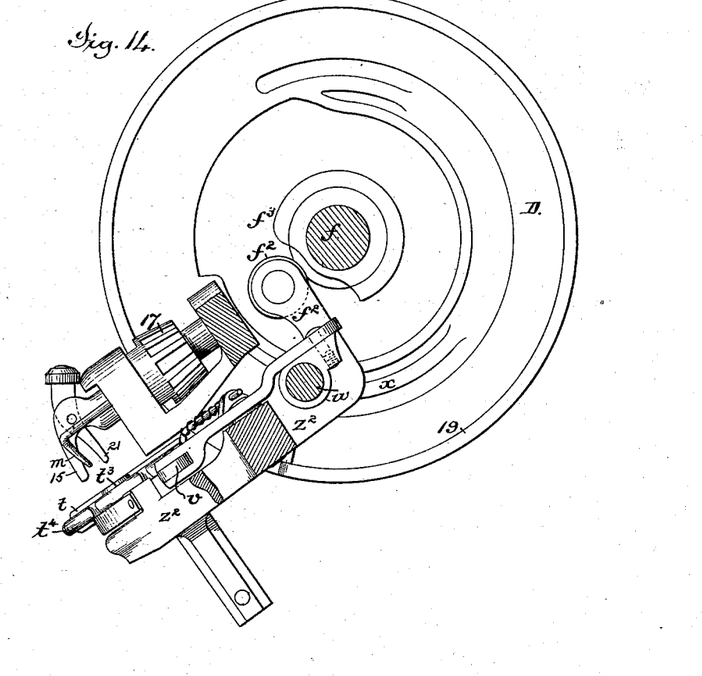
Fig. 14 is a similar view, showing the changed position of the cord-holder at the time when the tyer shall have about completed its movement.
Figure 15:
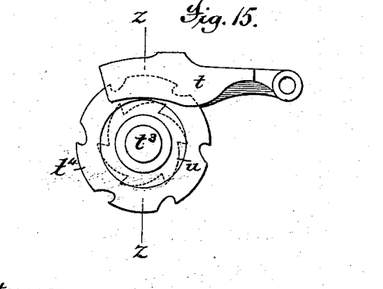
Fig. 15 is a skeleton or detail face view of the cord-holder disk and pinching-finger.
Figure 16:
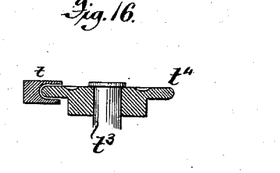
Fig. 16 is a detail section on line *z z*, Fig. 15.

In the present machine I have added to the tyer (shown in my said patent) a claw or holder device, $m$, the arrangement of which with the other parts of the tyer is fully shown in Figs. 8, 9, 10, 11, and 12. This claw has a shaft, 54, which lies in a longitudinal groove or bearing in the shaft 16 of the knot-tyer hook 15, and its point closes down at just the locality where the knotting-hook and the finger 21 close together. When in a closed position said claw holds the cord or string on the knotting-hook until the hook and finger shall have been revolved far enough to cause the cord to draw toward the center of the shaft 16, and then it is caused to spring away from the said hook and finger to allow the tied knot to be drawn away from the last-named devices. The requisite movement of the claw is produced by means of the lateral arm or projection 55 on the rear end of its shaft, against which projection an arm, 56, is forced by the action of a spring, 57, or its equivalent. When the tyer is at rest the claw $m$ is raised from the tying-hook, as shown in Fig. 9, the spring-arm 56 holding the claw up by pressing against the projection 55. In this position of the parts the claw, it will be seen, does not at all interfere with the laying of the cord over the tying-hook. When the tying-hook begins to revolve the projection 55 passes along under and in contact with a stationary cam, 58, thereby holding the claw back while the tying-hook continues its revolution, thus causing said claw to bear against the point of the tying-hook with merely sufficient force to keep the cord from slipping off the hook; but as the knotting-hook comes round and begins to ascend to its final position, it then being necessary to hold the loop very securely while the finger opens from the hook to seize the cord within its loop, as shown in Fig. 14, the projection 55 comes against and is pressed hard by the spring-arm 56, whereby the claw is caused to press so forcibly against the tying-hook as to prevent the possibility of the loop slipping therefrom. The positions of the projection 55 and spring-arm 56 during this part of the movement are best seen in Fig. 12, where it will be observed that in these positions the yielding arm 56 has come to a stop against the rigid point $c^4$ of the cast-iron tyer-frame and affords an almost rigid opposition to any turning of the bent rear end, 55, of the claw-shaft 54. Finally, just before the tying-hook comes to rest the projection 55 passes the dead-point of its bearing against the spring-arm 56, and having by its ascent pushed the arm back against the pressure of the spring 57, it is then forced forward by the pressure of said spring, whereby the claw is again raised from the tying-hook to make place for the laying on of another cord-loop.

Figure 13:
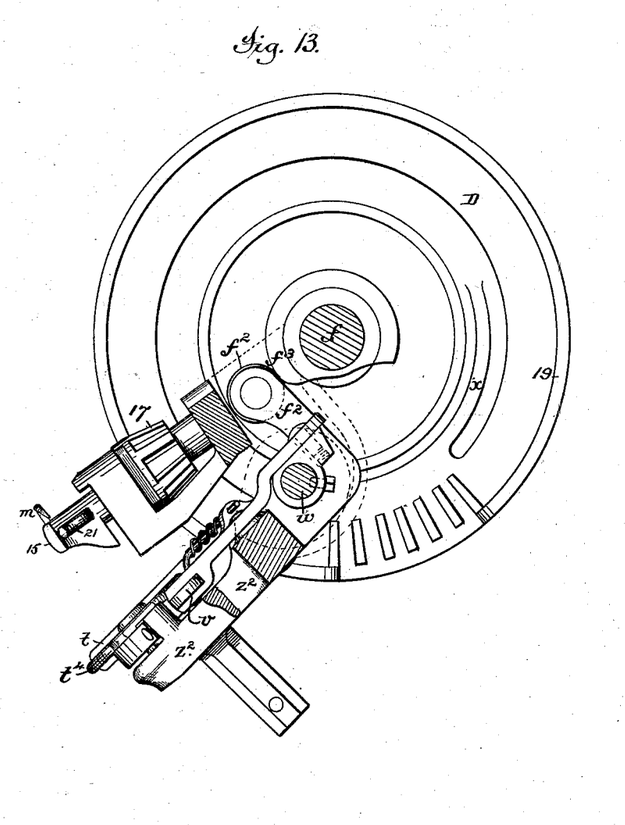
Fig. 13 is a skeleton view, showing so much of the tying mechanism as is necessary to illustrate the relative positions of the tyer and cord-holder devices at the time when the former begins to operate.

The mechanism for seizing, holding, and releasing in proper succession the ends of the cord during the tying or knotting operation is different from that shown in my said patent, and consists essentially in a notched circular disk, $t^4$, arranged to turn freely on a stud, $t^3$, (see Figs. 13, 14, 15, and 16,) and having combined with it an overlapping stationary gripping plate or arm, $t$, all as plainly shown in the drawings. The said disk, between the peripheral portion of which and the impinging overlapping surfaces of arm $t$ the cord is securely gripped, is periodically rotated by means of a ratchet-wheel, $u$, moved by a pawl, $v$, which is actuated from a sliding bar or shaft, $w$, moved by the cam-surface $x$ of the wheel D, and this cord-holding mechanism is mounted on a swinging frame or casting, $Z^2$, which is pivoted about the shaft $w$ in such a manner that during the tying operation the said cord-holding devices or mechanism are drawn bodily up toward the tyer by the cord, thus enabling the tyer to take up the necessary cord or slack to form the loop of the knot, instead of permitting the cord to be pulled through the cord-holder, as in the case of my said patent. By the action of a cam, $f^3$, on the arm $f^2$ (see Figs. 13 and 14) the cord-holding mechanism mounted on the swinging frame $Z^2$, as aforesaid, is positively returned to its normal position, and during its forced descent (caused by the action of cam $f^3$) the said cord-holder pulls downward on the cord wound around the knotter, and thus operates to keep the cord tight on the knotter, and also taut between the knotter and the cord-holder, to facilitate the cutting. The cam $f^3$ also operates to positively hold down the cord-holder while it receives or grips and holds fast the cord again brought to it by the next movement of the needle-arm. By the use thus of a cord-holder which does not permit the cord to pull through it at any time, and which is pulled bodily up toward the tyer by the action of the latter, and is positively returned to and held fast in its normal position by the cam $f^3$, in the place of such cord-holding mechanism as shown in my patented machine, I do not only avoid the complexity necessary to a cord-holder designed to automatically ease up or relax its grip on the cord at given times, but I insure a proper yielding up of the cord toward the tyer at the right time to facilitate the formation of the loop of the knot. I insure a proper pull-back on the cord to cause the loop to be drawn tight on the knotter and to also render the action of the knife easier. I avoid all liability of either a breakage of the cord by reason of the cord-holder not letting slip the cord as wanted, or a looseness of the knot in consequence of the cord slipping too freely through the cord-holder.

The cord-guide V carries the knife 59, as clearly shown; but, as this is claimed in another application filed by me, I do not make any claim to it in this application.

Having now so fully explained my several improvements that those skilled in the art can make and use my invention, what I claim herein as new, and desire to secure by Letters Patent, is—

1. In combination with the arms or fingers for supporting the grain against the compressive action of the needle-arm during the operation of binding the gavel, an auxiliary arm, S, located between the said fingers and adapted to be moved as described, and means for throwing into gear the mechanism for binding the gavel, all substantially as set forth.

2. In combination with the tyer and a cord-holder mounted on the swinging frame $Z^2$, pivoted as described, to oppose its weight against the cord, the arm $f^2$ on said frame and the cam $f^3$ on the shaft $f$, adapted to control the action of the cord-holder, substantially as and for the purposes hereinbefore described.

3. In combination with the described tyer, a claw, $m$, and means for actuating the same, the whole arranged to operate substantially in the manner and for the purpose set forth.

In witness whereof I have hereunto set my hand this 20th day of June, 1881.

JOHN F. APPLEBY.

In presence of—
C. M. CASTLE,
C. MUNSIN.